United States Patent
Stierle et al.

(10) Patent No.: US 7,510,464 B2
(45) Date of Patent: Mar. 31, 2009

(54) VIBRATION DAMPING DEVICE, IN PARTICULAR FOR AN ELECTRIC HAND MACHINE TOOL, AND A TRANSMISSION EQUIPPED WITH SUCH A VIBRATION DAMPING DEVICE

(75) Inventors: Peter Stierle, Waldenbuch (DE); Juergen Wiker, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 11/167,724

(22) Filed: Jun. 27, 2005

(65) Prior Publication Data

US 2006/0053960 A1    Mar. 16, 2006

(30) Foreign Application Priority Data

Jul. 2, 2004 (DE) .................. 10 2004 032 177

(51) Int. Cl.
*B24B 41/00* (2006.01)
(52) U.S. Cl. .................. 451/343; 464/180
(58) Field of Classification Search .......... 464/127, 464/180; 74/573.1, 431, 433.5, 574.4; 451/343; 188/378
See application file for complete search history.

(56) References Cited

U.S. PATENT DOCUMENTS

| | | | | |
|---|---|---|---|---|
| 2,159,235 A | * | 5/1939 | Tyler et al. .................. 74/574.4 |
| 2,245,240 A | * | 6/1941 | Wittel .................... 74/574.4 X |
| 2,464,362 A | * | 3/1949 | Wilson ...................... 74/573.1 |
| 3,552,230 A | * | 1/1971 | McLean ................. 188/378 X |
| 3,619,848 A | * | 11/1971 | Salzmann |
| 4,787,868 A | * | 11/1988 | Hoshiba et al. ......... 464/180 X |
| 5,226,756 A | * | 7/1993 | Takahashi et al. |
| 6,089,204 A | * | 7/2000 | Shaffer .................. 74/574.4 X |
| 6,358,153 B1 | * | 3/2002 | Carlson et al. .......... 188/378 X |
| 2004/0082283 A1 | * | 4/2004 | Lindell et al. ................ 451/343 |
| 2004/0226789 A1 | * | 11/2004 | Doornbos et al. |

FOREIGN PATENT DOCUMENTS

| | | |
|---|---|---|
| GB | 1 312 941 | 4/1973 |
| JP | 64-83945 | 3/1989 |
| RO | 106908 | 7/1993 |
| SU | 1145185 | 3/1985 |

OTHER PUBLICATIONS

Mancuso, Jon R., Couplings and Joints, N.Y. Marcel Dekker, Inc., pp. 154 and 155, TJ183.M36 1999.*

* cited by examiner

*Primary Examiner*—Greg Binda
(74) *Attorney, Agent, or Firm*—Michael J. Striker

(57) ABSTRACT

A vibration damping device has a rotation element connectable to a drive shaft in a frictional, nonpositive way and provided with at least one chamber filled with a material selected from the group consisting of a pourable material and a fluid material and capable of absorbing vibration energy.

6 Claims, 4 Drawing Sheets

VIBRATION DAMPING DEVICE, IN PARTICULAR FOR AN ELECTRIC HAND MACHINE TOOL, AND A TRANSMISSION EQUIPPED WITH SUCH A VIBRATION DAMPING DEVICE

BACKGROUND OF THE INVENTION

The present invention relates to a vibration damping device, in particular for damping powertrain vibrations in an electric hand machine tool. The present invention also relates to a transmission, in particular for an electric hand machine tool, equipped with such a vibration damping device.

A transmission of an electric hand machine tool contains gears with a helical or threaded gearing, which are usually sintered for cost reasons. Cut gears, whose production costs are high, are only used for high-quality units that require a high degree of running smoothness. In comparison to cut gears, sintered gears have higher manufacture-induced tolerances. In a transmission, this can lead to additional oscillations and vibrations in the power train.

Prior inventions have already proposed inserting spring elastic damping elements, in particular made of rubber or a rubber-like material, between the drive gear and the output shaft to reduce power train vibrations. The damping elements, which act tangentially between the drive gear and the output shaft, compensate for vibrations. They also reduce the powerful starting forces exerted on the gearing, which occur due to the inertia of masses when the drive motor is switched on or reduce the load peaks occurring in the gearing during operation.

SUMMARY OF THE INVENTION

Accordingly, it is an object of the present invention to provide a vibration damping device, in particular for an electric hand machine tool, and also a transmission equipped with such a vibration damping device which are further improvements of the existing devices.

The present invention proposes a vibration damping device, in particular for reducing powertrain vibrations in an electric hand machine tool, which has a rotation element that can be connected to a drive shaft in a frictionally engaging manner; the rotation element has at least one chamber filled with a pourable or fluid material capable of absorbing vibration energy.

The installed vibration damping device, which is connected to a drive shaft in a frictionally engaging manner, rotates around the shared rotation axis in order to perform its damping function. A drive shaft is understood here to mean any shaft used to drive the device, both in a power train and in an output train. In particular, a drive shaft can also be an output spindle. The vibration damping device functions independently of a load exerted by means of drive moments. Its service life is therefore practically unlimited.

If an impact occurs during rotation, then this is damped by virtue of the fact that the pourable or fluid material counteracts the impact due to its inertia. Shifts of material occur, but the rotation element continues to rotate with the drive shaft. The friction generated in the pourable or fluid material or between the pourable or fluid material and the rotation element partially converts the impact energy into heat. In particular, the material can be sand or a liquid. There are any number of conceivable embodiments of the chamber that would permit a shifting of material.

The vibration damping device is simply designed, takes up only a small amount of space, and can be inexpensively produced since it does not require heavy-duty materials. Another advantage is that the vibration damping device can also be subsequently integrated easily and without great expense into any hand machine tool, for example it can also be integrated into a compressed air tool and in particular, can be integrated into an electric hand machine tool. The installation of the vibration damping device can be easily incorporated into an existing assembly process. The vibration damping device can be used as a separate component or can be embodied in a suitable location in the form of a transmission component, in particular a gear.

The vibration damping device physically achieves a certain impact or vibration damping with any material and any geometry. It is advantageous, however, for at least one damping element to be accommodated in a freely moving fashion in the at least one chamber. The number, size, and material of the damping elements can be selected depending on the damping ratio to be achieved. In order to achieve a high damping ratio, it is preferable to provide the damping element with a large mass. For a damping ratio of the kind usually required in electric hand machine tools, it is advantageous to use a metal such as steel as the material for the damping element. The damping element, which can move freely in the fluid, also counteracts the impact due to its inertia. At first, the damping element remains stationary. The fact that the damping element remains stationary consequently forces the material surrounding it to be displaced. The impact energy is then converted into heat by means of friction.

It is useful to use a viscous fluid as the material. A fluid is considered to be viscous if its viscosity is greater than that of water. If high damping ratios are to be achieved, it is preferable to use high viscosity fluids such as oil or glycerine.

For cost reasons, it is preferable for the rotation element of the vibration damping device to be embodied as rotationally symmetrical. This simply and simultaneously prevents the vibration damping device from introducing any additional imbalance into the system. It is advantageous for the rotation element to be embodied as annular or disk-shaped, with a central opening to accommodate the drive shaft. This design allows the vibration damping device to be easily attached to a drive shaft. It is also possible to retrofit devices. The drive shaft can also be attached to the rotation element in a form-locked manner.

If several damping elements are used, then these must be situated so that no additional imbalance is introduced into the system. To this end, a number of chambers that are spaced apart from one another, preferably uniformly, in the circumference direction are incorporated into the rotation element. The chambers, which are produced e.g. by means of drilling, are filled with the fluid and, after insertion of the at least one damping element, are sealed shut in a fluid-tight fashion. Chambers of this kind can also be incorporated directly into an existing gear, for example a crown gear, of a transmission. The gear then constitutes the rotation element of the vibration damping device.

In another advantageous embodiment form, the chamber is embodied in the form of an annular cavity in the rotation element. An annular damping element that can move freely in the fluid is inserted into this chamber. To this end, the damping element, while having the same annular radius as the cavity, has a smaller cross-section than it. This embodiment form makes it possible to use the maximum size of damper mass without causing additional imbalance.

The friction ratio of the damping element in relation to the fluid and therefore the achievable damping ratio can be advantageously increased if the damping element is provided with a number of recesses. These recesses can be embodied in the form of ridges, gaps, niches, holes, or indentations. It is also possible for the entire surface to be sunk and for only individual, higher burrs to remain.

The present invention also discloses a transmission, in particular for an electric hand machine tool, which has a vibration damping device of the type mentioned above for reducing power train vibrations.

The chamber of the vibration damping device is advantageously integrated into an output gear of the transmission, in particular embodied in the form of a crown gear. Due to the existing space or volume of the crown gear, it is particularly easy to integrate the vibration damping device into the transmission in this location. This also makes it possible to retrofit an already existing transmission with the damping device.

Other advantages ensue from the following description of the drawings. The drawings depict exemplary embodiments of the invention. The drawings, the specification, and the claims contain numerous features in combination. A person skilled in the art will also suitably consider the features individually and unite them in other meaningful combinations.

DESCRIPTION OF THE PREFERRED EMBODIMENTS

Figure 1:
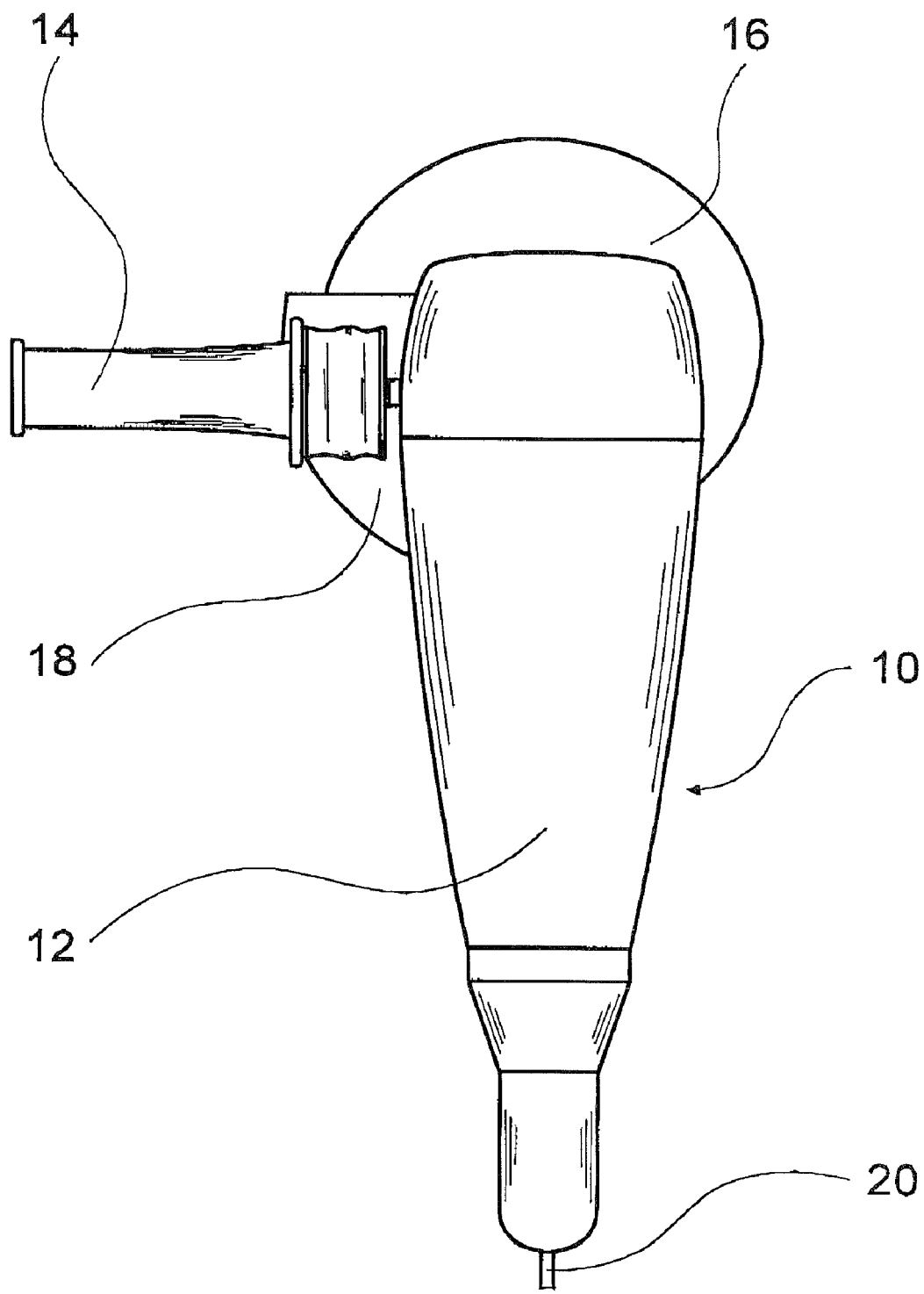
FIG. 1 is a schematic top view of a right angle grinder.

FIG. 1 shows a simplified depiction of a right angle grinder 10 as an example of an electric hand machine tool. The right angle grinder 10 has a housing 12 that contains the electric drive motor; a handle 14 for guiding the device during operation is attached to the side of the housing 12. At the front end of the housing 12, the output spindle—not visible here—protrudes at a 90° angle in relation to the longitudinal axis of the housing and is attached to a grinding disk 16. In order to protect the operator from flying particles such as dust, shavings, or sparks, a safety guard 18 is mounted over the grinding disk 16 on the handle side of the housing 12. To supply electrical energy, a power cable 20 is integrated into the rear end of the housing 12.

Figure 2:
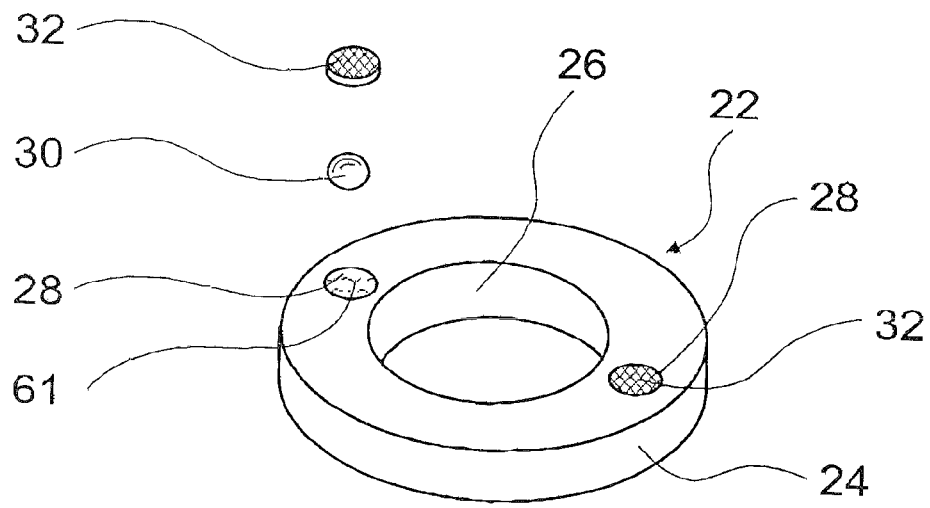
FIG. 2 is an exploded view of an annular rotation element of a vibration damping device.

FIG. 2 shows an exploded view of a vibration damping device 22 in the uninstalled state. The vibration damping device 22 has an annular rotation element 24 with a central opening 26. By means of the central opening 26, the rotation element 24 can be attached to an output spindle in a frictionally engaging and form-locked manner. Two chambers 28, each with a circular cross section, are let into opposite sides of the annular rotation element 24 by means of drilling. A ball-shaped damping element 30 made of steel is inserted into each of the chambers 28, which are filled with high viscosity fluid 61. The damping element 30 has a smaller diameter than the diameter of the chamber 28 so that it can move freely in the fluid 61. Both chambers 28 are sealed shut in a fluid-tight manner by means of a sealing cap 32. One of the chambers 28 here is shown while it is still open. The sealing cap 32 is screw connected to the chamber 28 or to the rotation element 24. In an alternative embodiment form, the sealing cap can also be glued to the rotation element 24 or attached to it in some other way.

Figure 3:
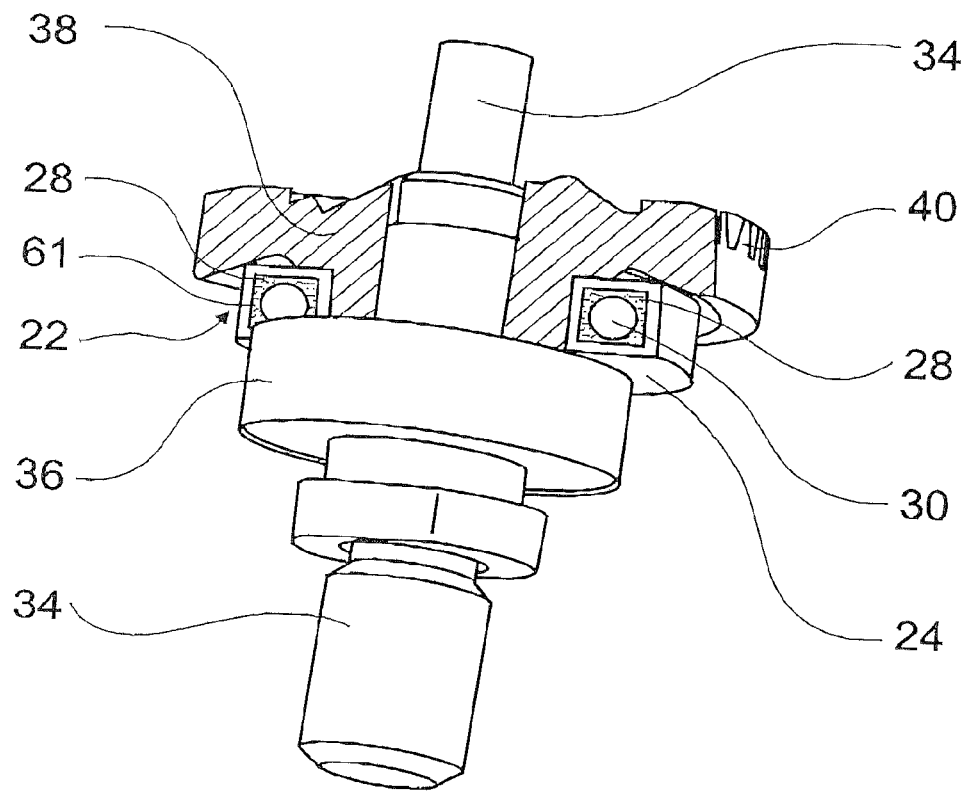
FIG. 3 is a half section through the vibration damping device according to FIG. 2, mounted onto the output spindle of a right angle grinder.

FIG. 3 shows a half section through the vibration damping device 22 according to FIG. 2 in the installed state. The annular rotation element 24 here is fastened to an output spindle 34 of a right angle grinder 10 according to FIG. 1, between a ball bearing 36 and a crown gear 38. For connection to the output spindle 34, the rotation element 24 engages an annular extension of the crown gear 38 in a frictional and form-locked manner, which extension is in turn press-fitted onto the output spindle 34 in a frictionally engaging and form-locked manner. The ball bearing 36 supports the output spindle 34 itself against the housing 12 of the right angle grinder 10. A gearing 40 of the crown gear 38 transmits the rotation of an electric motor to the drive spindle 34. The drawing clearly shows the two chambers 28 integrated into the rotation element 24, each of which accommodates a freely moving, ball-shaped damping element 30. The two chambers 28 are each filled with the highly viscous fluid 61. Naturally, more than two chambers 28 can also be integrated into the crown gear 38. It is preferable to provide the chambers 28 spaced uniformly apart from one another in the circumference direction in order to avoid an imbalance during operation.

Figure 4:
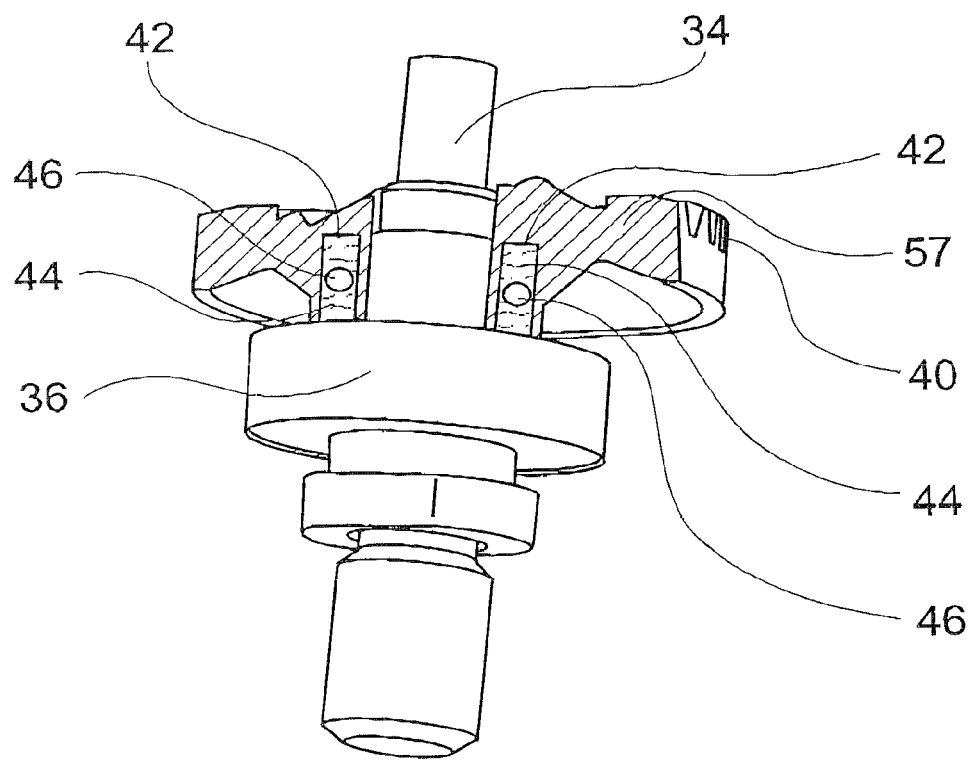
FIG. 4 is a half section through a vibration damping device that has individual chambers and is integrated into a crown gear of an output spindle.

FIG. 4 shows an integrated embodiment of the vibration damping device 22 according to FIG. 2. The rotation element 24 here is not embodied as a separate component, but is instead embodied as a structural part of the crown gear 57 that is press-fitted onto the drive shaft 34 in a form-locked manner for drive purposes. Two bores 42 are let into an annular extension of the crown gear 57 encompassing the drive spindle 34 and are filled with oil as the fluid 44. The two bores 42 each contain a ball-shaped damping element 46 made of metal. In this integrated embodiment form, the crown gear 57 containing the damping elements 46 constitutes the rotation element of the vibration damping device. This embodiment permits an existing transmission to be inexpensively retrofitted with the vibration damping device 22, without needing to be structurally redesigned.

Figure 5:
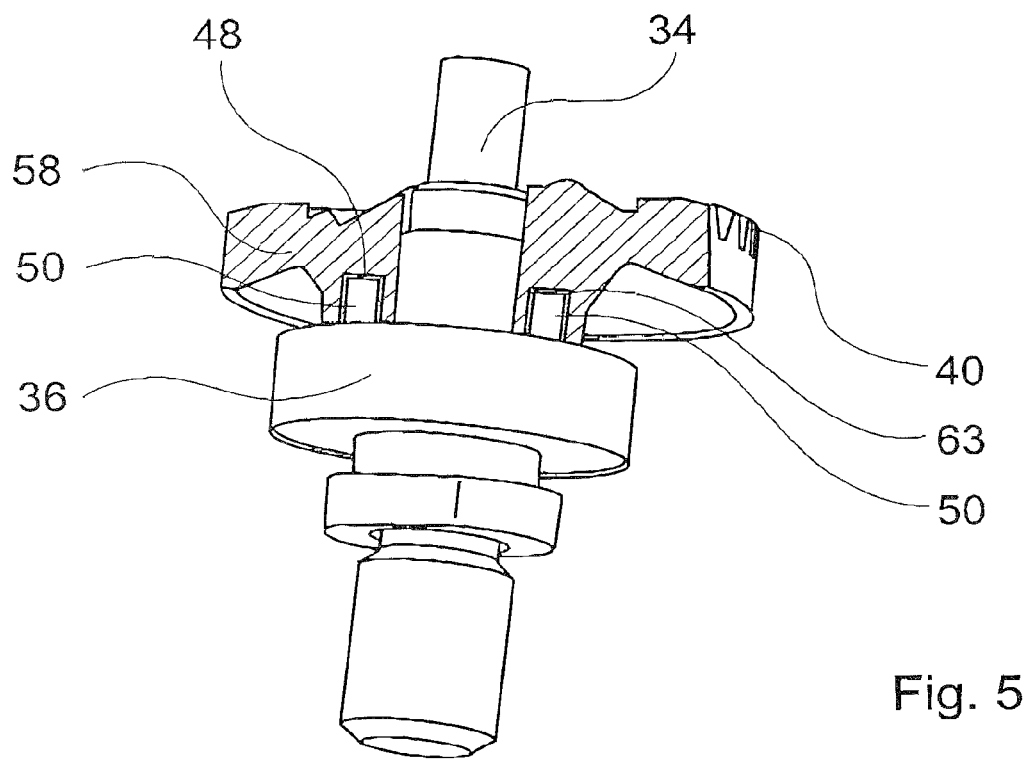
FIG. 5 is a half section through a vibration damping device that has a circumferential chamber in the form of an annular cavity and is integrated into a crown gear of an output spindle.

FIG. 5 shows another integrated exemplary embodiment. In this case, a circumferential, annular cavity 48 is incorporated as a single chamber into the crown gear 58 that drives the output spindle 34. An annular damping element 50 made of metal is inserted in a freely moving fashion into this fluid-filled cavity 48. The annular design has the advantage of greater damping masses, which makes it possible to achieve a higher damping ratio. In order to increase the frictional resistance of the annular damping element 50 in relation to the fluid 63, recesses are let into it, which are shown in greater detail in FIG. 6.

Figure 6:
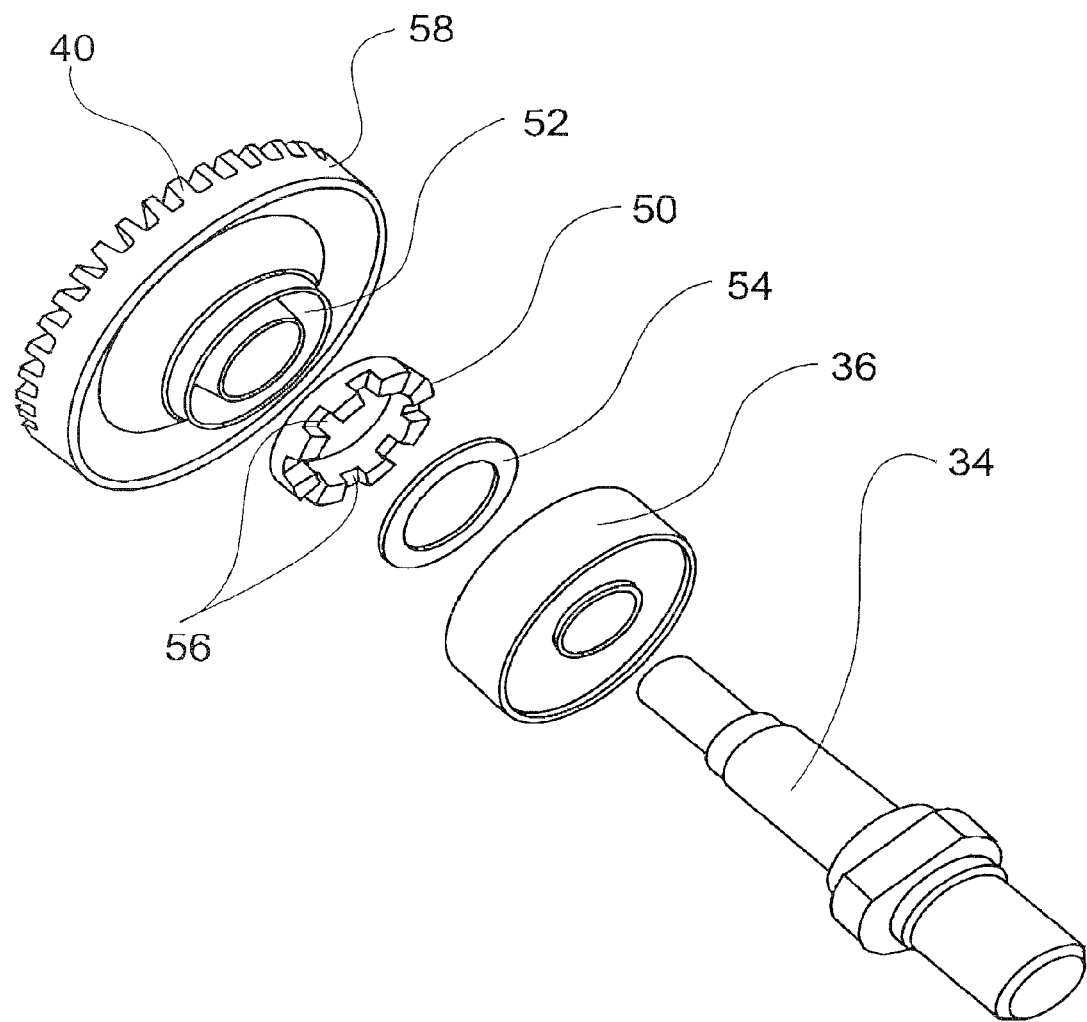
FIG. 6 is an exploded view of the integrated vibration damping device according to FIG. 5.

The integrated exemplary embodiment according to FIG. 5 appears again in the exploded view according to FIG. 6. The drawing here shows the output spindle 34 that is supported and guided in the ball bearing 36. The driving crown gear 38 with the gearing 40 has an annular circumferential groove 52 on its underside. The annular damping element 50 is inserted into this annular groove 52. The damping element 50 has a number of recesses 56 arranged circumferentially in order to increase its frictional resistance in relation to the fluid. After being filled with fluid, the annular groove 52 is sealed shut in a fluid-tight fashion with a sealing disk 54.

It will be understood that each of the elements described above, or two or more together, may also find a useful application in other types of constructions differing from the types described above.

While the invention has been illustrated and described as embodied in vibration damping device, in particular for an electric hand machine tool, and a transmission equipped with such a vibration damping device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An electric hand machine tool vibration damping device, comprising:
   a rotation element connectable to a drive shaft of an electric hand machine tool in a frictional, nonpositive way, whereby the rotation element is integrated in a crown gear, wherein said crown gear transmits a rotation of an electric motor to the drive shaft, said rotation element having at least one chamber, wherein said at least one chamber is configured as an annular cavity;
   a fluid material capable of absorbing vibration energy, said at least one chamber being filled with said material; and
   at least one damping element accommodated in a freely moving fashion in said at least one chamber and capable of moving in said material, wherein said damping element is provided with a plurality of recesses for increasing its frictional resistance in relation to the fluid, wherein said damping element is substantially annular and accommodated in said annular cavity, wherein said damping element has an annular radius that is the same as an annular radius of said cavity, and wherein said damping element has a smaller cross-section than a cross-section of said cavity.

2. An electric hand machine tool vibration damping device as defined in claim 1, wherein said at least one chamber is sealed shut in a fluid-tight fashion.

3. An electric hand machine tool vibration damping device as defined in claim 1, wherein the plurality of recesses of the damping element are spaced apart from one another in a circumferential direction.

4. An electric hand machine tool vibration damping device as defined in claim 1, wherein the plurality of recesses form a tooth profile.

5. An electric hand machine tool vibration damping device as defined in claim 1, wherein the crown gear is a component of an angular gear.

6. An electric hand machine tool transmission, comprising:
   a drive shaft;
   an output gear which is configured as a crown gear, whereby the crown gear transmits a rotation of an electric motor to said drive shaft; and
   a vibration damping device including a rotation element connected to said drive shaft of an electric hand machine tool in a frictional, nonpositive way, wherein the rotation element is integrated in the crown gear, said rotation element having at least one chamber, wherein said at least one chamber is configured as an annular cavity; and
   a fluid material capable of absorbing vibration energy, said at least one chamber being filled with said material, wherein the vibration damping device comprises at least one damping element accommodated in said at least one chamber and capable of moving in said material, wherein said damping element is provided with a plurality of recesses for increasing its frictional resistance in relation to the fluid, wherein said damping element is substantially annular and accommodated in said annular cavity, wherein said damping element has an annular radius that is the same as an annular radius of said cavity, and wherein said damping element has a smaller cross-section than a cross-section of said cavity.

* * * * *